June 19, 1934.    R. J. STATZ    1,963,216
BRAKE TESTING APPARATUS
Filed Jan. 30, 1930
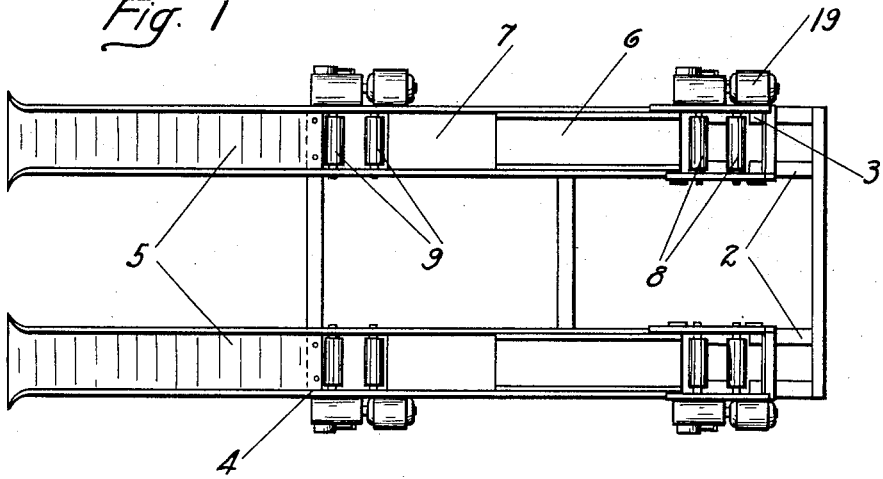
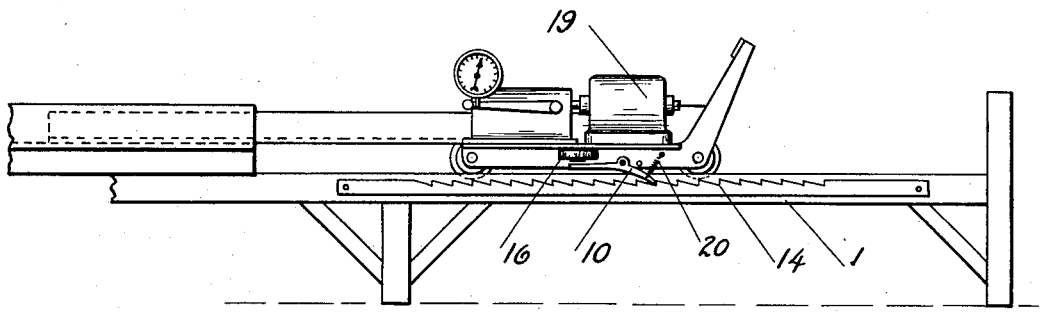
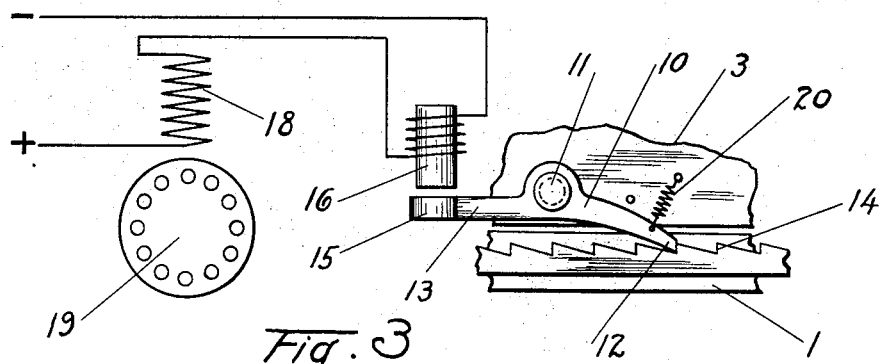
INVENTOR.
ROBERT J. STATZ
BY
ATTORNEY.

UNITED STATES PATENT OFFICE 1,963,216

BRAKE TESTING APPARATUS

Robert J. Statz, South Bend, Ind., assignor to Bendix-Cowdrey Brake Tester, Inc., Fitchburg, Mass., a corporation of Delaware Application January 30, 1930, Serial No. 424,685

5 Claims. (Cl. 73—51)

This invention relates to brake testing machines and more particularly to means for locking the traveling carriages of a brake testing machine in an operative position.

Heretofore, it has been customary to secure the movable front wheel carriages of brake testing machines for testing four wheel brakes simultaneously by manually operated locking devices. This necessitates that care be exercised that these devices are operated to lock the traveling carriages securely in position before motive power is applied to the wheels of a vehicle positioned thereon.

It has frequently happened that operators have failed to secure the locking devices before applying motive power to the brake testing machine, with the result that the vehicle undergoing test rides up over the rollers upon which it normally rests and collides with the frame of the machine, damaging both the vehicle and testing machine.

In order to avoid such accidents and to insure that the forward traveling carriages of the brake testing machines are habitually locked in proper position before motive power is applied to the machine, I have devised an automatic locking device which will positively lock the forward traveling carriages in proper position without attention from the operator. This not only saves time in operating the brake testing machines, but insures against accidents as well.

With this object in view, I have provided on the forward traveling carriages of the brake testing machine pawls adapted to engage ratchets secured to each side of the frame upon which the carriages travel. These pawls are adapted to be disengaged from the ratchets by electrical means to be hereinafter disclosed.

The above and other details of construction and novel features of the invention will become apparent from the description taken in connection with the accompanying drawings, in which:

Figure 1 is a plan view of the type of four wheel brake testing machine to which the invention is applied;

Figure 2 is a side elevation showing the improved locking device attached to one of the forward traveling carriages; and Figure 3 is an enlarged fragmentary view of the locking device illustrating an electrical release means in diagram.

As disclosed, the brake testing machine to which the invention is applied consists of a frame 1 comprising a plurality of tracks or runways 2 on which travel the forward movable carriages 3 of the brake testing machine. The rear carriages 4 are fixed in position adjacent the upper ends of ramps 5. Slidable runways 6 attached to each of the forward carriage 3 telescopingly engage stationary runways 7 attached to the fixed rear carriages 4.

When a motor vehicle, the brakes of which are to be tested, is placed in position on the testing machine, it is driven under its own motive power up the inclined ramps 5, the front wheels overriding the fixed carriages 4 and traversing the runways 7 and 6 until they engage rollers 8 on the forward carriages 3. Further forward movement of the motor vehicle then carries forward the movable carriages 3 until the back wheels of the vehicle are in position between rollers 9 on the fixed carriages 4. The testing machine is then in operative position.

In order to secure the forward carriages 3 in this position, I have provided on each carriage a pawl 10 rockably mounted on a trunnion 11 secured to the side flange of each movable carriage. Each of the pawls 10 have two arms 12 and 13, the former adapted to engage ratchets 14 secured to the side frame 1 of the brake testing machine. The arms 13 on the pawls 10 have flattened surfaces 15 at the free end thereof adapted to co-operate with a solenoid magnet 16 energized by a winding 17 in series with a metal filled winding 18 of the operating motors 19 of the brake testing machine.

The pawls 10 are normally held in engagement with the ratchets 14 by the action of the solenoid magnets 16 energized by current supplied when the motors 19 are in operation, and will be held in engaging position as long as the motors are in operation. As soon, however, as the current is shut off from motors, springs 20 will lift the pawls 10 out of engagement with the ratchets 14.

From the foregoing description it will be clear that the pawls 10 by engaging the ratchets 14 will secure the carriages 3 against forward movement so long as the motors 19 are in operation and that when the motors are shut off, the pawls will be automatically disengaged from ratchets 14 by the action of spring 20.

It will be apparent from the above that I have provided a simple automatic locking device which will positively and automatically lock the forward movable carriages of a brake testing machine against movement during such time as the machine is in operation.

While I have shown one embodiment of the invention in detail, it is to be understood, that I do not limit the scope of the invention to any particular embodiment or otherwise than is defined by the terms of the appended claims.

I claim:

1. A brake testing machine comprising a frame, a runway thereon, a movable carriage on the runway, an interlocking device between the movable carriage and the frame, an electrical motor for operating the machine including a circuit therefor, and means in the motor circuit retaining the locking device in locked position during operation of the motor.

2. A brake testing machine comprising movable carriages, electrically operated motors for the carriages including electrical circuits therefor, means for locking the movable carriages of the machine in operative position, and electrical magnetic means in the motor circuits for controlling the locking means.

3. A brake testing machine comprising a frame, a runway on the frame, a movable carriage on the runway, an electrically driven motor, an electrical circuit therefor, a pawl carried by the movable carriage, a rack on the frame for cooperation with the pawl, and means in the motor circuit for actuating the pawl for engagement with the rack when the motor is in operation.

4. A brake testing machine comprising a movable carriage including a pair of rollers, an electrically operated motor for driving the rollers including a circuit therefor, means for locking the movable carriage in operative position, an electrical magnetic means in the circuit retaining the locking means in locked position during operation of the motor.

5. A brake testing machine comprising movable carriages each including a pair of rollers, an electrically operated motor for each pair of rollers including circuits therefor, means for locking each movable carriage in operative position, and electrical magnetic devices in the circuits for retaining the locking means in locked position during operation of the rollers.

ROBERT J. STATZ.